(12) United States Patent
Tokumitsu et al.

(10) Patent No.: US 8,175,152 B2
(45) Date of Patent: May 8, 2012

(54) PICTURE CODING APPARATUS AND METHOD

(75) Inventors: Masayuki Tokumitsu, Kyoto (JP); Satoshi Hasuo, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1439 days.

(21) Appl. No.: 11/729,876

(22) Filed: Mar. 30, 2007

(65) Prior Publication Data

US 2007/0280348 A1 Dec. 6, 2007

(30) Foreign Application Priority Data

Jun. 1, 2006 (JP) ................. 2006-153863

(51) Int. Cl.
*H04N 7/12* (2006.01)
(52) U.S. Cl. ................. 375/240.1; 375/240.16
(58) Field of Classification Search ............... 375/240.1, 375/240.12, 240.16
See application file for complete search history.

(56) References Cited

U.S. PATENT DOCUMENTS

| 5,646,687 | A  | * | 7/1997  | Botsford et al. ......... 375/240.12 |
| 6,356,589 | B1 | * | 3/2002  | Gebler et al. ............. 375/240.1 |
| 6,574,276 | B2 | * | 6/2003  | Cougnard et al. ....... 375/240.12 |
| 7,463,683 | B2 | * | 12/2008 | Van Der Schaar et al. 375/240.1 |
| 7,936,814 | B2 | * | 5/2011  | Greenfield et al. ...... 375/240.01 |
| 2003/0138045 | A1 | * | 7/2003 | Murdock et al. ......... 375/240.12 |
| 2006/0114995 | A1 | * | 6/2006 | Robey et al. ............. 375/240.12 |

FOREIGN PATENT DOCUMENTS

| JP | 9-294262 | 11/1997 |
| JP | 3621598  | 11/2004 |

* cited by examiner

*Primary Examiner* — Gilberto Barron, Jr.
*Assistant Examiner* — Virginia T Ho
(74) *Attorney, Agent, or Firm* — Rabin & Berdo, P.C.

(57) ABSTRACT

A moving picture coding apparatus divides each frame of a moving picture into parts and assigns the parts to different coding units, which compressively code their respective parts. The coding process includes motion compensation with respect to a reference frame. Each coding unit has its own reference frame memory. To generate reference frame data, each coding unit receives, decodes, and decompresses the coded data generated by at least one other coding unit, as well as decompressing the data it has coded itself. Consequently, only ordinary coded data have to be passed between different coding units, which saves bandwidth and eliminates the need for special coding hardware and development and testing tools.

11 Claims, 9 Drawing Sheets

PICTURE CODING APPARATUS AND METHOD

BACKGROUND OF THE INVENTION

1. Field of the Invention

The present invention relates to a picture coding method and apparatus that code a moving picture by dividing each frame of the picture into parts and assigning the parts to different computing resources.

2. Description of the Related Art

With the increasing definition (resolution) of display apparatus in recent years has come the need to code high-definition moving pictures.

Moving picture coding has always been a computationally intensive task. The coding of moving pictures with the resolution of high-definition television (HDTV), for example, has required specialized hardware.

The performance of computing devices is also increasing, however, and this has led to proposed systems that code moving pictures in real time by assigning different parts of each frame to different computing resources. Japanese Patent Application Publication No. 9-294262, for example, describes a system that harnesses multiple hardware coders to operate concurrently on the separate parts. Japanese Patent No. 3621598 describes a similar multiprocessor system in which the multiple processors execute software to decode the different parts of each frame concurrently.

The coders in Japanese Patent Application Publication No. 9-294262 communicate with one another to transfer coding information so that in performing motion compensation, they can cross the boundaries between the different parts. The motion compensation areas of the different coders accordingly overlap. This overlapping scheme prevents the boundaries between different parts from becoming visible when the picture is decoded, but the disclosed scheme has the disadvantage of requiring a protocol analyzer and other tools to determine whether the coders are communicating correctly. Moreover, because of the special nature of the coding information being communicated, standard protocol analyzers or modified versions thereof cannot be used; it is necessary to develop a completely new protocol analyzer, which adds to the development cost and product cost of the coding apparatus.

A further problem is that the overlapping parts of each frame must be transmitted to both coders involved in the overlap, which uses up extra bandwidth on the data paths within the coding apparatus.

SUMMARY OF THE INVENTION

An object of the present invention is to improve the efficiency of information transfer when a picture is divided into parts for coding by separate coding units in such a way as to prevent degradation of the picture at the boundaries between the parts.

The invented picture coding method codes a moving picture made up of a series of frames. Each frame is divided into parts. The different parts of the frame are assigned to different coding units and coded by the coding units, and the resulting coded parts are combined to obtain compressively coded data for the frame.

Each coding unit has a reference frame memory that stores reference picture data representing a preceding frame. Portions of the reference picture data resembling portions of the assigned part of the current frame are selected to carry out motion compensation. The coding unit compresses its assigned part to obtain first compressed data, codes the first compressed data, and outputs the result as first coded data.

In addition, each coding unit receives second coded data that have been compressively coded by one or more other coding units. A decoder decodes the second coded data to obtain second compressed data. The first and second compressed data are both decompressed to obtain new reference picture data, which are stored in the reference frame memory for use in compressing and decompressing the picture data in the next or a subsequent frame.

This method enables coded data to be passed from one coding unit to another by the same communication protocol as used to send the coded data to the combiner that combines the data. The coded data can be passed between different coding units efficiently not only because the data are compressed but also because the data can be coded and decompressed by the same methods that each coding unit uses to code and decompress its own data. Moreover, in development, debugging, and troubleshooting, the flow of coded data between coding units can be analyzed by the same tools and methods as used to analyze other coded data flows.

DETAILED DESCRIPTION OF THE INVENTION

Embodiments of the invention will now be described with reference to the attached drawings, in which like elements are indicated by like reference characters.

First Embodiment

Figure 1:
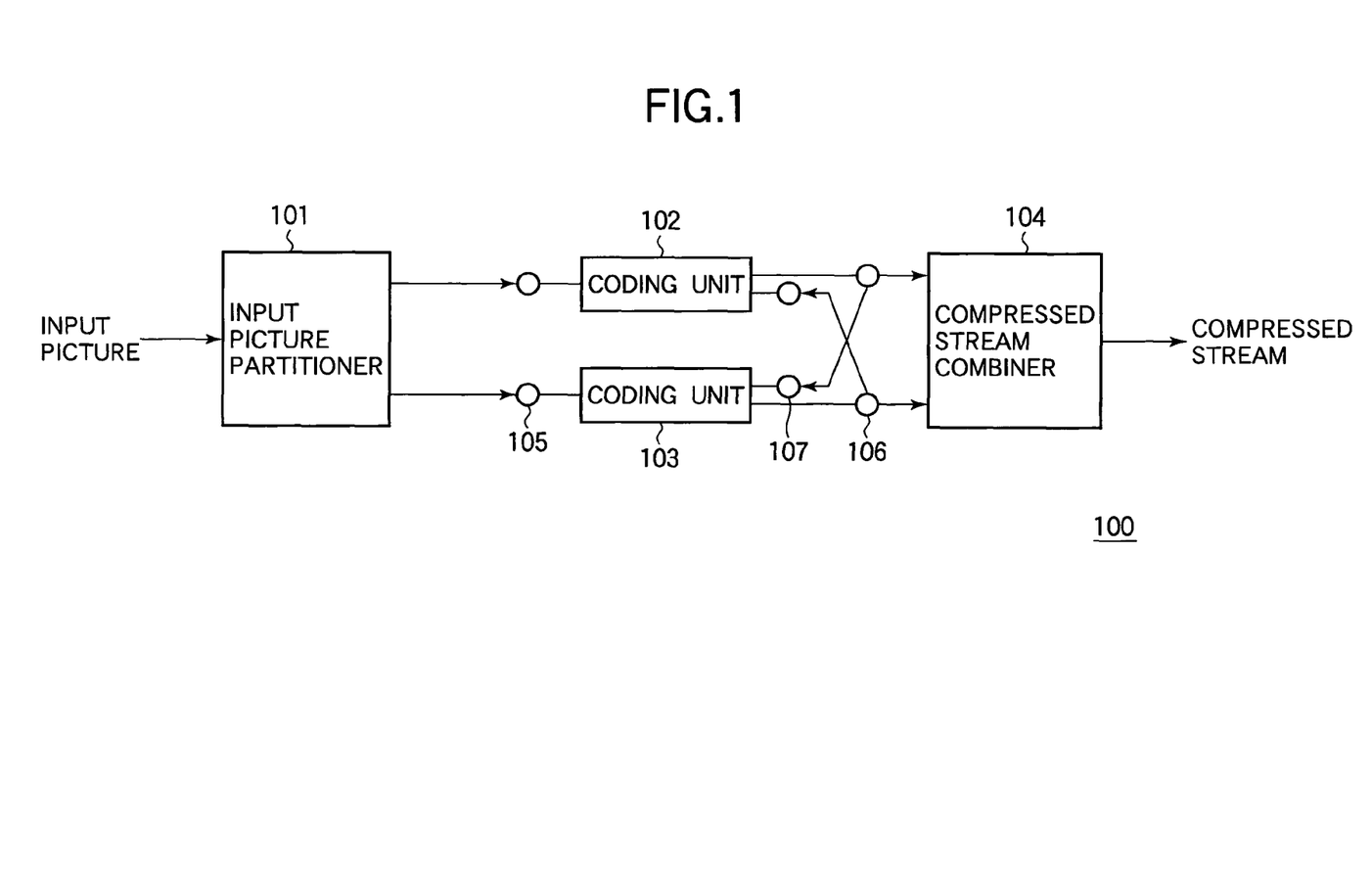
FIG. 1 is a block diagram of a moving picture coding apparatus according to a first embodiment of the invention.

Referring to FIG. 1, the moving picture coding system or apparatus 100 in the first embodiment comprises an input picture partitioner 101, a pair of coding units 102, 103, and a compressed stream combiner 104. These constituent elements may be separate computing devices linked by a network, or separate processing units in a single computing device interconnected by a bus. The network configuration will be assumed in the description below.

The input picture partitioner 101 receives an input picture, divides it into parts by following a predetermined procedure, outputs one part to the picture input port 105 of coding unit 102, and outputs the other part to the picture input port of coding unit 103. If necessary, the input picture partitioner 101 may attach information to each part to specify the location of the part in the picture.

In dividing the input picture, the input picture partitioner 101 may apply any of various methods. For example, it may apply a rule that dynamically determines the size ratio of the two areas, and attach information specifying the size ratio to each part. Alternatively, the way in which the input picture is divided and the coding unit to which each part is assigned may be predetermined, and the input picture partitioner 101 may simply execute the fixed division and assignment procedure.

The coding units 102 and 103 receive respective parts of the picture from the input picture partitioner 101 through their picture input ports 105, compressively code their respective parts, and output the compressively coded parts to the compressed stream combiner 104 from their compressed stream output ports 106. Coding unit 102 also outputs its compressively coded part to a compressed stream input port 107 of coding unit 103; coding unit 103 also outputs its compressively coded part to a compressed stream input port of coding unit 102. The functions of the coding units 102, 103 in the first embodiment will be described in more detail below, but briefly, each of the coding units 102, 103 decompresses both the part it coded itself and the part it receives from the other coding unit through its compressed stream input port 107, and uses both decompressed parts as reference data in compressively coding its own part of the next picture.

The compressed stream combiner 104 receives the coded partial data streams from coding unit 102 and coding unit 103, combines them, and outputs a single compressively coded data stream.

Figure 2:
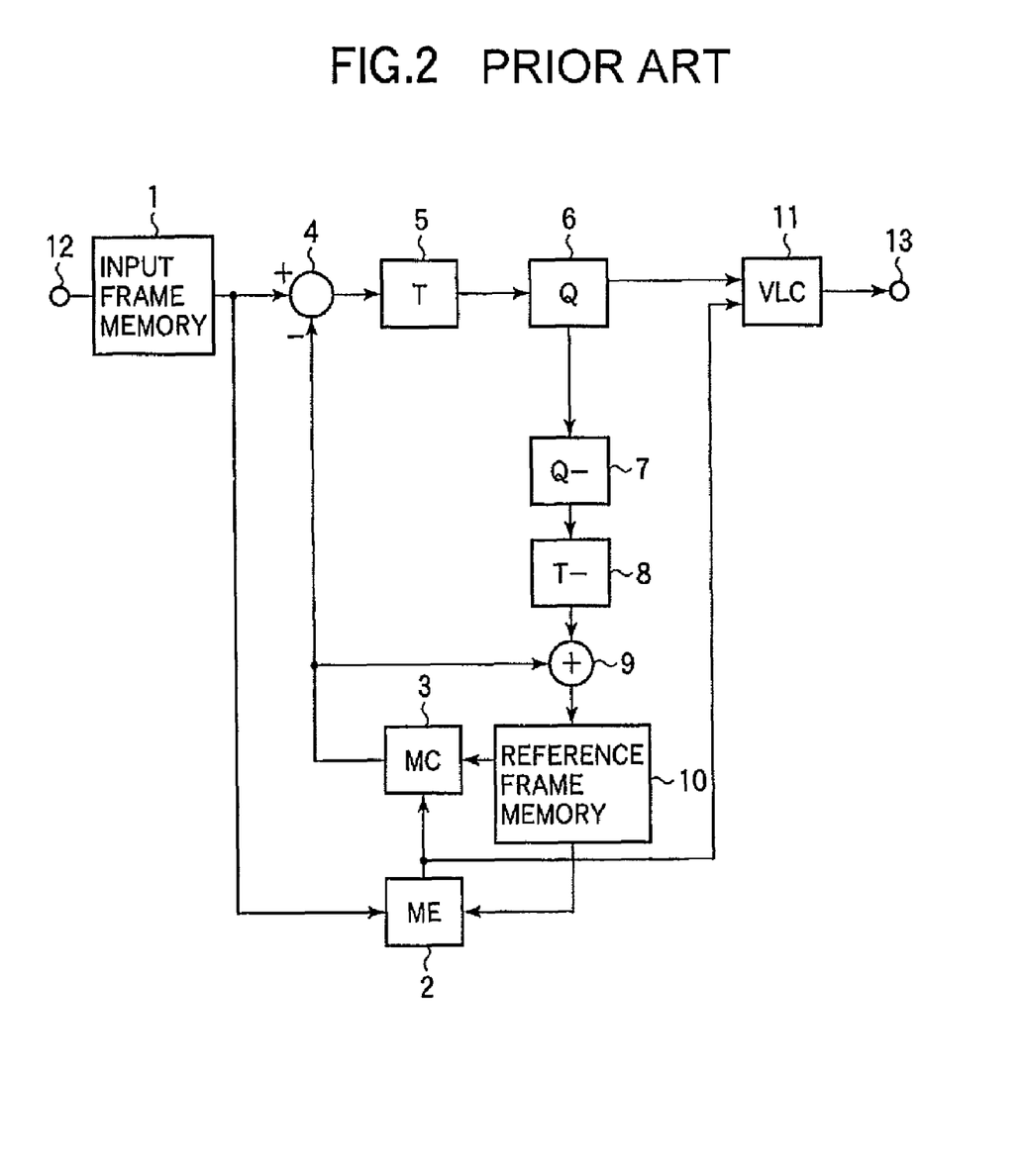
FIG. 2 is a functional block diagram of a conventional coding unit.

Each coding unit 102, 103 is generally similar to the picture coders-specified in the H.264 and MPEG-4 standards. As shown in FIG. 2, this general type of picture coder includes an input frame memory 1, a motion estimator (ME) 2, a motion compensator (MC) 3, a subtractor 4, a transform processor (T) 5, a quantizer (Q) 6, a dequantizer (Q-) 7, an inverse transform processor (T-) 8, an adder 9, a reference frame memory 10, a variable length coder (VLC) 11, a picture input port 12, and a compressed stream output port 13.

Figure 3:
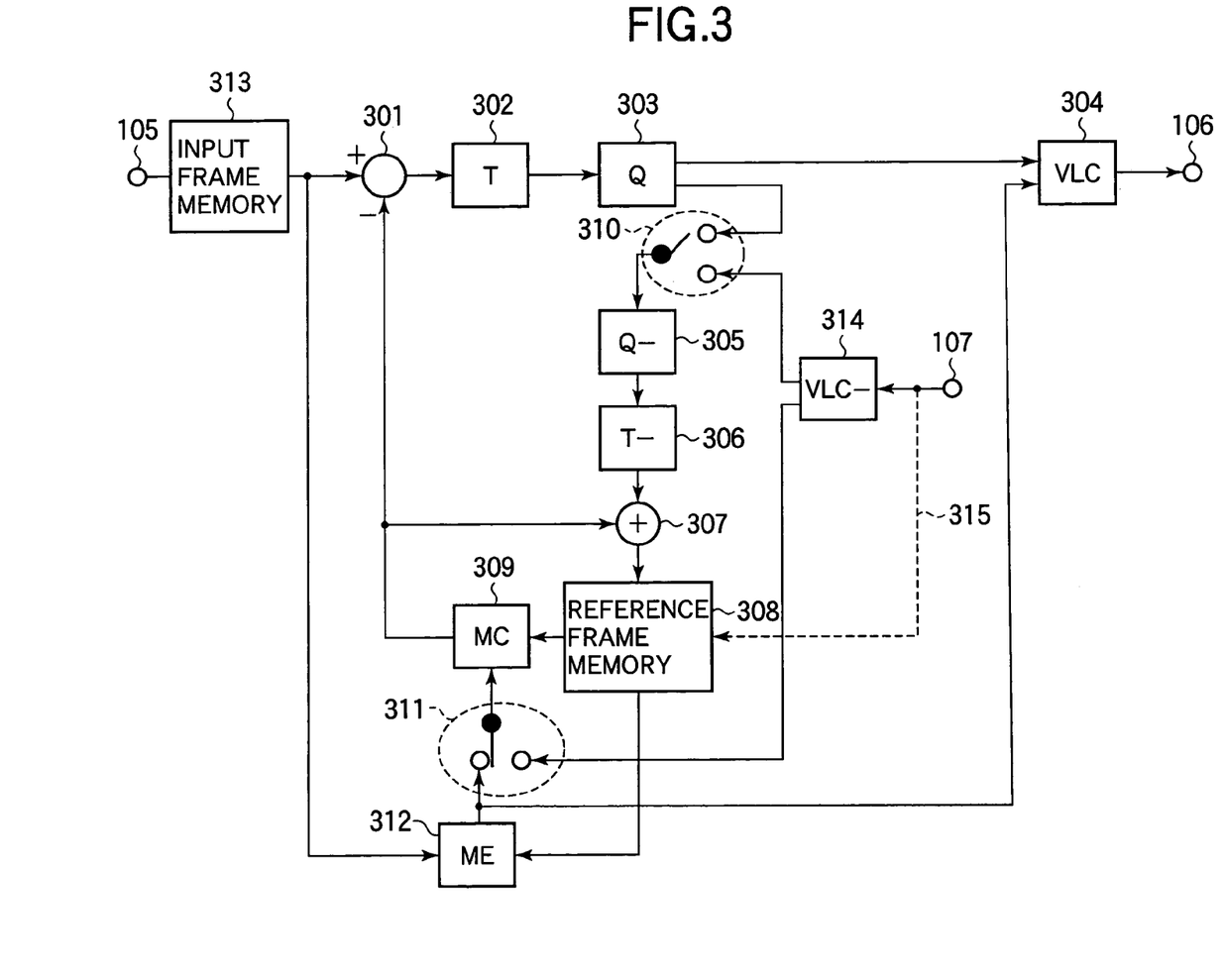
FIG. 3 is a functional block diagram of a coding unit in the first embodiment.

To this conventional coder configuration the first embodiment adds a variable length decoder and a pair of switches, giving both coding units 102, 103 the novel structure shown in FIG. 3. The coding unit shown in FIG. 3 is designated by reference numeral 300, representing either of the coding units 102 and 103. Many of the internal components of the coding unit 300 are the same as in FIG. 2, but they are renumbered so as to use the reference numerals in FIG. 1 for the picture input port 105, compressed stream output port 106, and compressed stream input port 107. The components not shown in FIG. 1 are the subtractor 301, transform processor 302, quantizer 303, variable length coder 304, dequantizer 305, inverse transform processor 306, adder 307, reference frame memory 308, motion compensator 309, switches 310 and 311, motion estimator 312, input frame memory 313, and variable length decoder (VLC-) 314.

The input frame memory 313 receives the part of the picture to be coded from the input picture partitioner 101 via the picture input port 105. The input frame memory 313 stores the received part, divides the stored part into macroblocks, and outputs each macroblock to the motion estimator 312 and subtractor 301. A macroblock is a block measuring sixteen pixels vertically and sixteen pixels horizontally, as specified in the H.264 and MPEG-4 standards.

When the subtractor 301 receives each macroblock from the input frame memory 313, it also receives corresponding predicted picture data from the motion compensator 309. The subtractor 301 takes the difference between the pixel value of each pixel in the macroblock and the corresponding pixel value in the predicted picture data received from the motion compensator 309, and outputs the difference to the transform processor 302. The difference represents the unpredicted component of the pixel value, that is, the difference between the actual pixel value and the predicted value. The data output from the subtractor 301 will be referred to as prediction difference picture data.

Upon receiving prediction difference picture data from the subtractor 301, the transform processor 302 transforms the received data to the spatial frequency domain by using a method such as a discrete cosine transform (DCT). This transform replaces the pixel data with frequency coefficient data. Because nearby pixels are highly correlated in typical pictures, the frequency coefficients with large values tend to cluster in the lower spatial frequencies. The transform processor 302 outputs the transformed coefficients to the quantizer 303.

The quantizer 303 receives the transformed coefficients from the transform processor 302 and quantizes them, thereby compressing the coefficient data by replacing substantially continuous data with data that change in discrete steps. Known quantization methods may be employed. In the first embodiment, the quantized coefficients are represented as multiples of a basic quantization step size, small frequency coefficients becoming zero. The quantizer 303 outputs the quantized transform coefficients to the variable length coder 304 and, through switch 310, to the dequantizer 305.

The dequantizer 305 receives quantized coefficients from the quantizer 303 or variable length decoder 314 through switch 310 and expands them back to frequency coefficients (e.g., DCT coefficients) by performing a process substantially inverse to the quantization process performed by the quantizer 303: for example, by multiplying the quantized coefficients by the quantization step size. The dequantizer 305 outputs the dequantized coefficients to the inverse transform processor 306.

Upon receiving the dequantized coefficients from the dequantizer 305, the inverse transform processor 306 transforms them by performing a transform inverse to the transform performed by the transform processor 302 to obtain decompressed difference picture data in pixel space. The inverse transform processor 306 outputs the decompressed difference picture data to the adder 307.

When the adder 307 receives the decompressed difference picture data from the inverse transform processor 306, it also receives the corresponding predicted picture data from the motion compensator 309. The adder 307 adds the value of each pixel in the decompressed difference picture data to the value of the corresponding pixel in the predicted picture data to obtain reference picture data for use in predicting the next picture. The adder 307 outputs the reference picture data to the reference frame memory 308.

The reference frame memory 308 stores the reference picture data received from the adder 307.

When the motion estimator 312 receives a macroblock from the input frame memory 313, it uses the macroblock and the reference picture data stored in the reference frame memory 308 to search for a motion vector. The motion estimator 312 may use various known search methods: for example, it may search for a sixteen-by-sixteen block of pixels in the reference data such that the mean difference between corresponding pixel values in the received macroblock and the sixteen-by-sixteen reference data block satisfies a predetermined smallness criterion. The motion estimator 312 outputs the spatial coordinates of the sixteen-by-sixteen reference block relative to the received macroblock as motion vector information. The motion vector information is passed to the variable length coder 304 and, through switch 311, to the motion compensator 309.

When the motion compensator 309 receives motion vector information from switch 311, it uses the motion vector information to retrieve reference picture data from the reference frame memory 308 and thereby creates predicted picture data. The motion vector information may originate in the motion estimator 312 in either the same or a different coding unit. Motion vectors from a different coding unit are received at the compressed stream input port 107, decoded by the variable length decoder 314, and supplied to the motion compensator 309 through switch 311. The motion compensator 309 outputs the predicted picture data to the subtractor 301.

The variable length coder 304 receives the quantized coefficients from the quantizer 303 and the motion vector information from the motion estimator 312, and assigns variable-length codes thereto. The variable length coder 304 may employ any of various known variable-length coding methods, such as Huffman coding. The variable length coder 304 outputs compressively coded picture data through the compressed stream output port 106.

The variable length decoder 314 receives the compressively coded data stream from another coding unit and decodes it to obtain compressed coefficient information (quantized coefficients) and motion vector information. The variable length decoder 314 outputs the coefficient information (the quantized coefficients) to the dequantizer 305 through switch 310 and the motion vector information to the motion compensator 309 through switch 311.

Switch 310 selects either the input from the quantizer 303 or the input from the variable length decoder 314, and outputs the selected input to the dequantizer 305.

Switch 311 selects either the input from the motion estimator 312 or the input from the variable length decoder 314, and outputs the selected input to the motion compensator 309.

The compressed stream input port 107 receives the compressively coded data stream from other coding units (in the first embodiment there is only one other coding unit), and outputs the received compressively coded data stream to the variable length decoder 314. The compressed stream input port 107 also supplies storage location switching control information 315 to the reference frame memory 308 to control the switching of storage locations in the reference frame memory 308.

Next, the coding operation of the moving picture coding apparatus 100 in the first embodiment will be described with reference to FIGS. 1, 3, 4, and 5.

First, the general coding process carried out by the moving picture coding apparatus 100 will be described with reference to FIG. 1.

Figure 4:
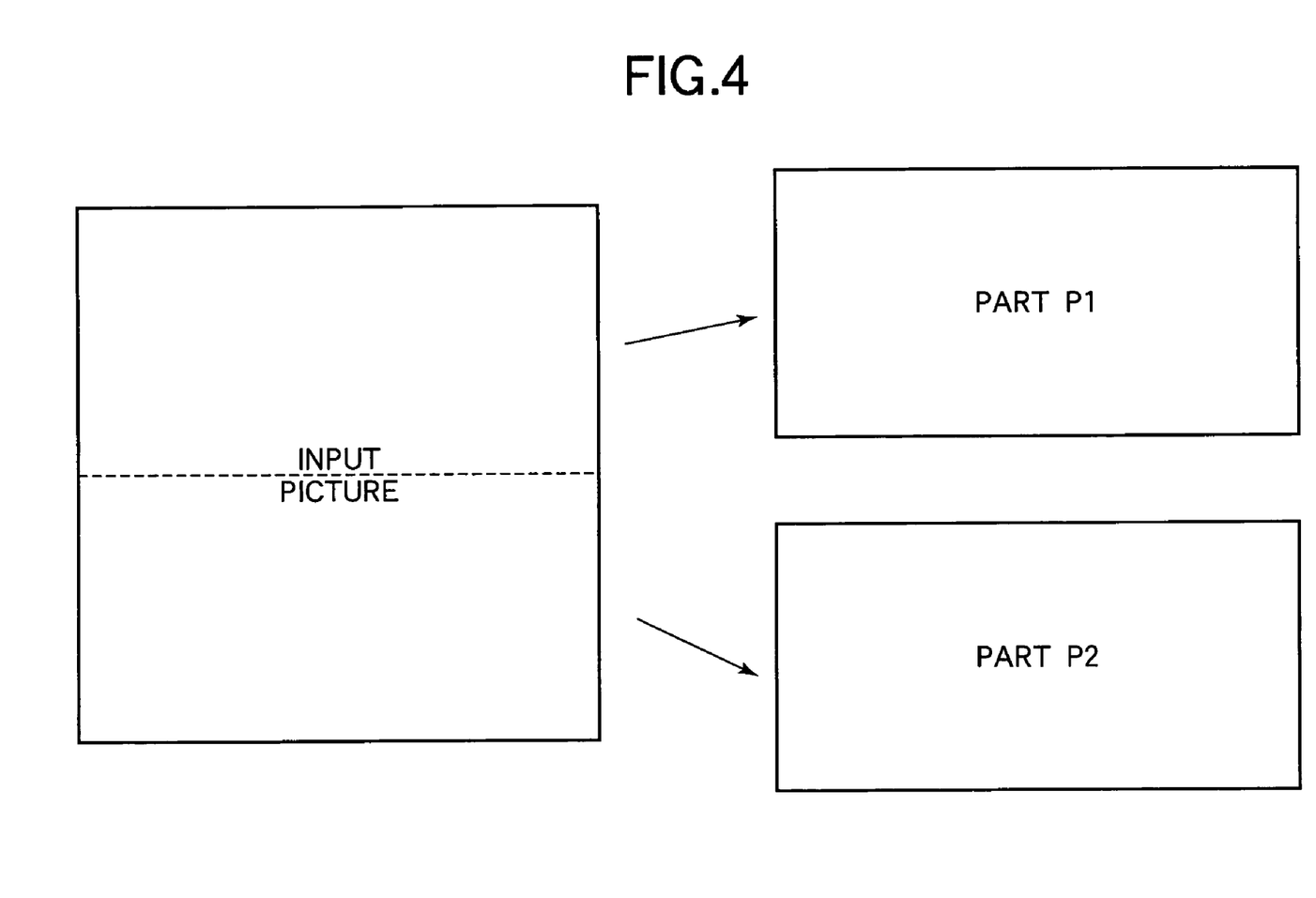
FIG. 4 illustrates the slicing of a picture into two parts in the first embodiment.

The input picture partitioner 101 receives an input picture, divides it into parts, sends one part to coding unit 102, and sends the other part to coding unit 103. Each part is accompanied (if necessary) by information specifying the location of the part. In the following description, each part is made up of a number of uniform horizontal slices. FIG. 4 illustrates the division of a picture into two substantially equal parts P1 and P2.

The coding units 102 and 103 receive their respective parts of the picture, compressively code their parts, and output respective compressively coded data streams to each other and to the compressed stream combiner 104. More specifically, coding unit 102 compressively codes its part and outputs a compressively coded data stream from its compressed stream output port 106 to the compressed stream combiner 104 and to the compressed stream input port 107 of coding unit 103. Similarly, coding unit 103 compressively codes its part and outputs a compressively coded data stream from its compressed stream output port 106 to the compressed stream combiner 104 and to the compressed stream input port 107 of coding unit 102.

The coding units 102, 103 use the compressively coded picture data they receive from each other as reference data in the compressive coding process, as described below. More precisely, the coding units 102 and 103 decode and decompress the received compressively coded data streams, and use the decompressed picture data as reference picture data.

The compressed stream combiner 104 combines the compressively coded data streams output by the coding units 102, 103 into a single compressively coded data stream.

Next, the operation of the coding units 102 and 103 will be described by describing the operation of the representative coding unit 300 in FIG. 3. First, the basic operation will be described; then particular features characterizing the first embodiment will be described.

The picture input port 105 receives one of the parts into which the input picture partitioner 101 has divided the picture and outputs the received part to the input frame memory 313.

The input frame memory 313 stores the received part of the picture, and divides each slice of the part into macroblocks. The input frame memory 313 outputs the stored macroblocks one by one. Upon completing the output all of the macroblocks in the stored part, the input frame memory 313 begins receiving its part of the next picture.

Figure 5:
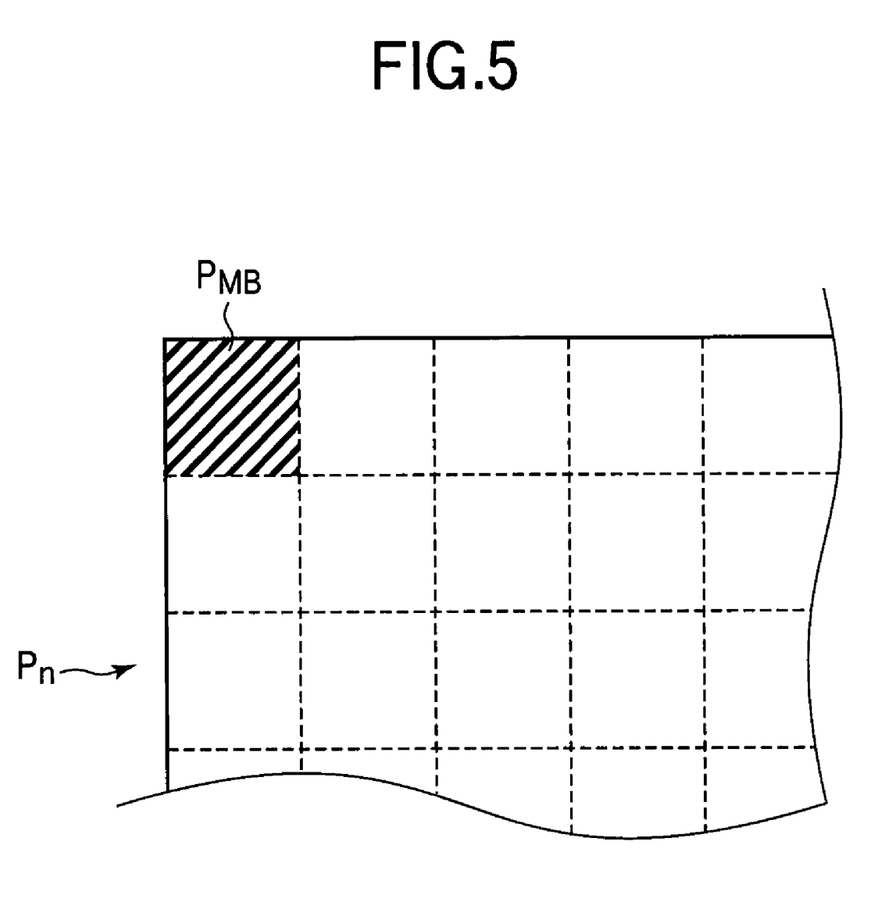
FIG. 5 illustrates the division of the moving picture into macroblocks in the input frame memory in coding unit in FIG. 3.

FIG. 5 illustrates the division into macroblocks. $P_n$ indicates the part of the picture stored in the input frame memory 313. $P_{MB}$ (the area indicated by hatching) indicates a macroblock, measuring sixteen pixels vertically and horizontally. Each macroblock is output to the motion estimator 312 and the subtractor 301.

Upon receiving each macroblock from the input frame memory 313, the subtractor 301 obtains prediction difference picture data by taking differences between pixel values in the macroblock and pixel values in predicted picture data supplied from the motion compensator 309, and outputs the prediction difference picture data to the transform processor 302. The prediction difference picture data represent differences from a more or less similar block, specified by a motion vector, in the preceding frame.

Upon receiving the prediction difference picture data from the subtractor 301, the transform processor 302 transforms the prediction difference picture data to the spatial frequency domain by a method such as the discrete cosine transform, generating coefficient data which are output to the quantizer 303.

The quantizer 303 quantizes the transformed coefficients and outputs the quantized coefficients, represented as multiples of the basic quantization step size, to the variable length coder 304 and switch 310. Switch 310 selects the input from the quantizer 303 and outputs the quantized coefficients to the dequantizer 305.

The dequantizer 305 expands the quantized coefficients back to frequency coefficients (e.g., DCT coefficients) by, for example, multiplying them by the quantization step size, thereby performing a process substantially inverse to the quantization process performed by the quantizer 303. The quantizer 303 outputs the dequantized coefficients to the inverse transform processor 306.

The inverse transform processor 306 transforms the dequantized coefficients by performing a transform inverse to the transform performed by the transform processor 302 to obtain decompressed difference picture data in pixel space. The inverse transform processor 306 outputs the decompressed difference picture data to the adder 307.

In synchronization with the output of the decompressed difference picture data, the motion compensator 309 supplies corresponding predicted picture data to the adder 307. The adder 307 adds the value of each pixel in the decompressed difference picture data to the value of the corresponding pixel in the predicted picture data to obtain picture data for use as reference data for predicting the next picture. The reference frame memory 308 stores the reference picture data received from the adder 307.

As noted above, the motion estimator 312 also receives each macroblock output from the input frame memory 313. The motion estimator 312 compares each received macroblock with the reference picture data stored in the reference frame memory 308, finds the position of a block of reference pixels having values close to the values of corresponding pixels in the received macroblock, and outputs the position as motion vector information to the variable length coder 304 and switch 311. Switch 311 selects the input from the motion estimator 312 and outputs the motion vector information to the motion compensator 309.

Upon receiving motion vector information from switch 311, the motion compensator 309 uses the motion vector information and the reference picture data stored in the reference frame memory 308 to create predicted picture data, and outputs the predicted picture data to the subtractor 301 and adder 307.

The variable length coder 304 assigns variable-length codes to the quantized coefficients received from the quantizer 303 and the motion vector information received from the motion estimator 312, and outputs the resulting compressively coded data stream through the compressed stream output port 106.

The general operation of coding a moving picture carried out by the coding unit 300 described above conforms to the MPEG-4 and H.264 standards.

Characterizing features of the operation of the coding unit 300 in the first embodiment will now be described below with reference to FIGS. 1, 3, and 6. More specifically, the compressive coding process, in which coding unit 102 and coding unit 103 decode and decompress each other's compressively coded data streams and store the decompressed picture data as reference picture data, will be described.

When the compressed stream input port 107 receives a stream of compressively coded data, switch 310 selects the input from the variable length decoder 314 and outputs the selected input to the dequantizer 305, while switch 311 selects the input from the variable length decoder 314 and outputs the selected input to the motion compensator 309.

The reference frame memory 308 receives storage location switching control information 315, which includes identifying information (ID) identifying the location of the decompressed picture data, and controls the switching of storage locations in the reference frame memory 308 accordingly. The switching of storage locations in the reference frame memory 308 will be described below.

The variable length decoder 314 receives the compressively coded data stream from the other coding unit and decodes it to obtain the original quantized coefficients and motion vector information.

The variable length decoder 314 outputs the original quantized coefficients to the dequantizer 305 through switch 310. The dequantizer 305 expands the quantized coefficients back to frequency (e.g., DCT) coefficients, and outputs the dequantized coefficients to the inverse transform processor 306. The inverse transform processor 306 transforms the dequantized coefficients received from the dequantizer 305 to obtain decompressed difference picture data in pixel space, and outputs the decompressed difference picture data to the adder 307.

The variable length decoder 314 outputs the original motion vector information to the motion compensator 309 through switch 311. The motion compensator 309 uses the motion vector information and the reference picture data stored in the reference frame memory 308 to create predicted picture data, and outputs the predicted picture data to the adder 307.

The adder 307 adds the value of each pixel in the decompressed difference picture data obtained from the inverse transform processor 306 to the value of the corresponding pixel in the predicted picture data obtained from the motion compensator 309 to generate picture data for use as reference picture data for predicting the next picture, and outputs the new reference picture data to be stored in the reference frame memory 308.

The storage location of the new reference picture data in the reference frame memory 308 is determined according to the identifying information (ID) included in the storage location switching control information 315. The switching of storage locations of reference picture data in the reference frame memory 308 will be described with reference to FIG. 6.

When the coding unit 300 (i.e., coding unit 102 or 103) generates a compressively coded data stream, it also generates identifying information (ID) identifying the location of the part of the input picture encoded in the compressively coded data stream, and outputs the identifying information together with the compressively coded data stream.

When the coding unit 300 receives a compressively coded data stream, including the above identifying information, through its compressed stream input port 107, the identifying information (ID) is extracted in the compressed stream input port 107 and placed in the storage location switching control information 315 sent to the reference frame memory 308. In this way the coding unit 300 learns the location of the reference picture data decompressed from the received compressively coded data stream in relation to the input picture as a whole. The storage location switching control information 315 may also include information indicating the coding unit from which the compressively coded data stream was received.

Figure 6:
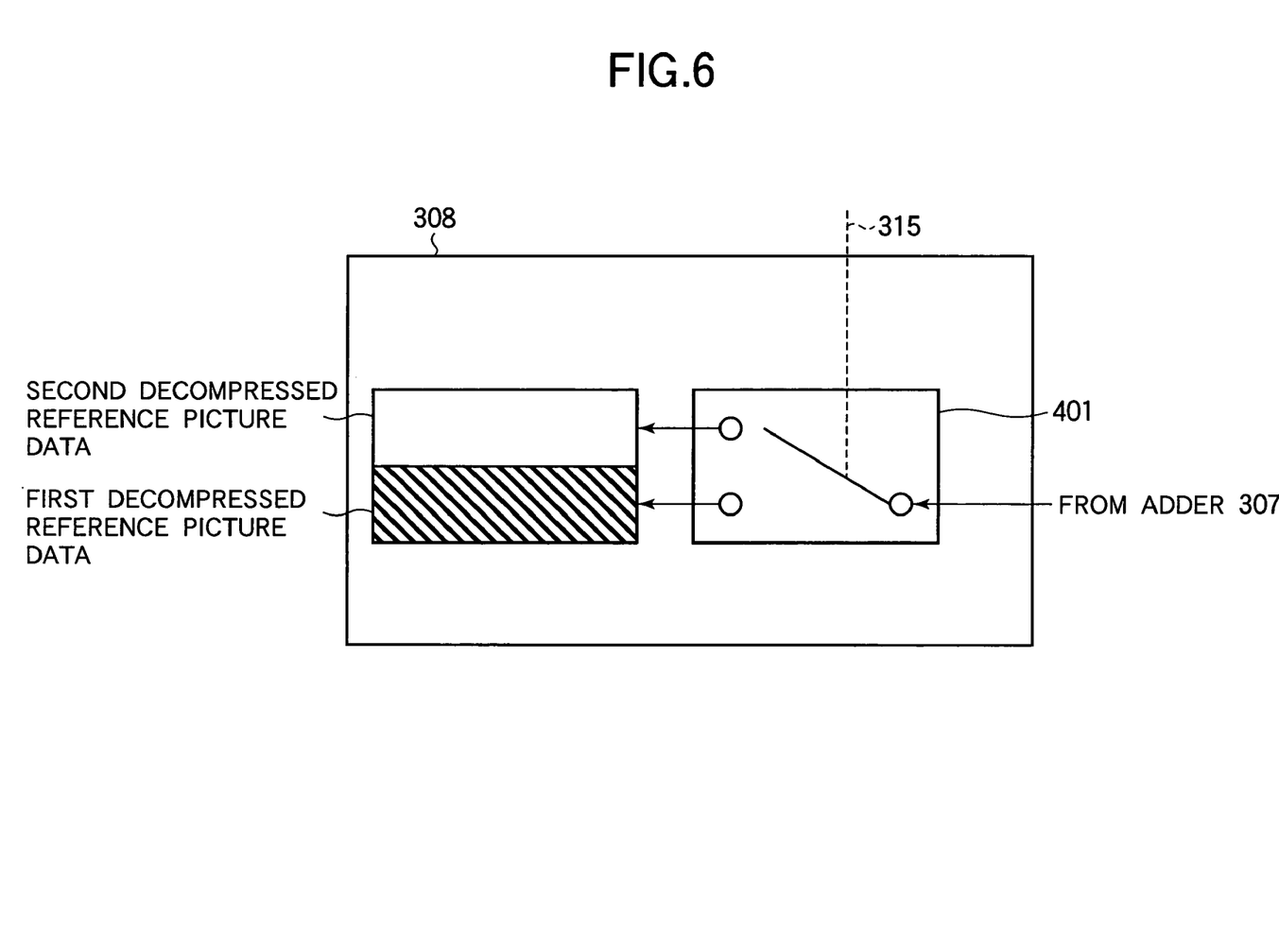
FIG. 6 illustrates the switching of storage positions in the reference frame memory in the first embodiment.

In FIG. 6, the decompressed picture data obtained from the compressed data that the coding unit 300 has compressed itself (first decompressed data) are stored in the location indicated by hatching. A switching processor 401 in the frame memory 308 selects this storage location and stores the decompressed picture data obtained from the adder 307 in it. When the coding unit 300 receives a compressively coded data stream and storage location switching control information 315 from the other coding unit via the compressed stream input port 107, the switching processor 401 selects a storage location (adjacent to the hatched storage location in FIG. 6) assigned to store data originating in the other coding unit, and stores the picture data (second decompressed data) from the adder 307 in the selected location.

The switching processor 401 determines the storage location of picture data in the reference frame memory 308 according to the identifying information (ID) included in the storage location switching control information 315 received from the other coding unit. This enables the reference data from both coding units to be stored so as to form a continuous reference picture in the reference frame memory 308. Both coding units 102 and 103 can therefore use the entire preceding frame as reference data in the compressive coding process.

The switching processor 401 may perform further switching functions within each of the two memory areas shown in FIG. 6, enabling each memory area to hold both decompressed picture data for the current frame and decompressed picture for the preceding frame simultaneously. A well-known double buffering scheme may be used, for example, to assure that regardless of the order in which the data are decompressed, all necessary data from the preceding frame will still be available for reference.

If the length of motion vectors is limited, storage schemes that permit partial overwriting of data for the preceding frame may also be employed, depending on the decompression sequence.

As described above, according to the first embodiment, since each coding unit receives the compressively coded picture data output from the other coding unit, in searching for motion vectors, it can search not only in its own assigned part of the preceding frame but also in the part assigned to the other coding unit. This feature of the invention prevents degradation of the picture at the boundaries between the parts.

According to the first embodiment, coded data are passed from one coding unit to another by having each coding unit read the coded data stream the other coding unit sends to the combiner. This form of data exchange requires no extra communication bandwidth, no new coding methods or facilities, no new decompression methods or facilities, and no new protocol analyzer, and is therefore inexpensive in terms of both product hardware and product development effort.

Second Embodiment

Figure 7:
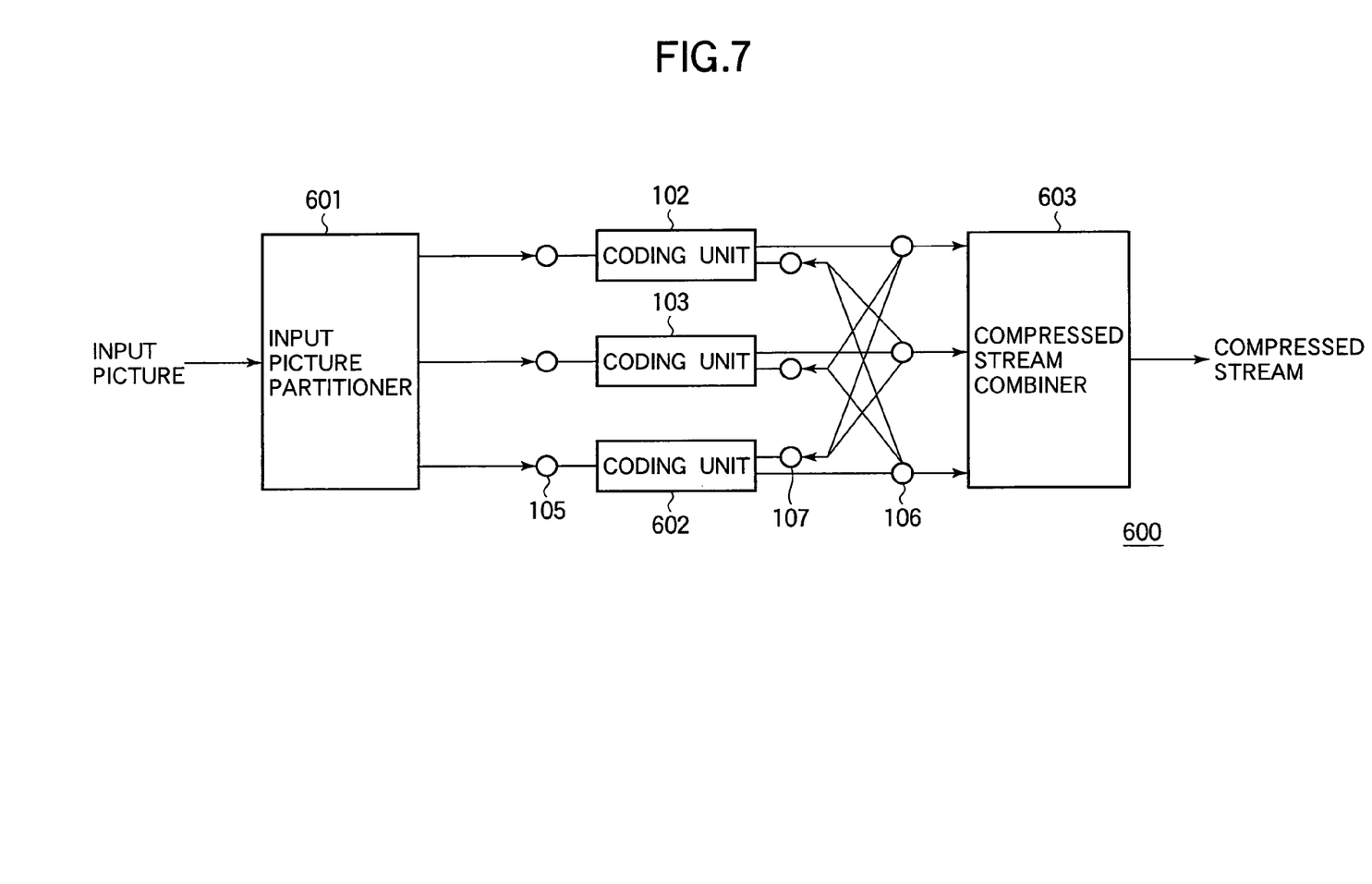
FIG. 7 is a block diagram of a moving picture coding apparatus according to a second embodiment of the invention.

Referring to FIG. 7, the moving picture coding apparatus 600 in the second embodiment comprises an input picture partitioner 601, coding units 102, 103, and 602 and a compressed stream combiner 603.

The differences between the first embodiment and the second embodiment are that the input picture partitioner 601 divides the input picture into three parts, the moving picture coding apparatus 600 comprises three coding units 102, 103, 602, and the compressed stream combiner 603 combines three coded parts received from these three coding units.

Structures and operations related to these differing features of the second embodiment will be described below. Descriptions of the structure and operation of constituent elements also found in the first embodiment will be omitted.

The input picture partitioner 601 has a single picture data input port and three picture data output ports. Like the input picture partitioner 101 in the first embodiment, the input picture partitioner 601 has the function of dividing the received input picture, but it differs from the input picture partitioner 101 by dividing the input picture into three parts. The input picture partitioner 601 outputs one part to the coding unit 102, outputs another part to the coding unit 103, and outputs the remaining part to the coding unit 602.

Figure 8:
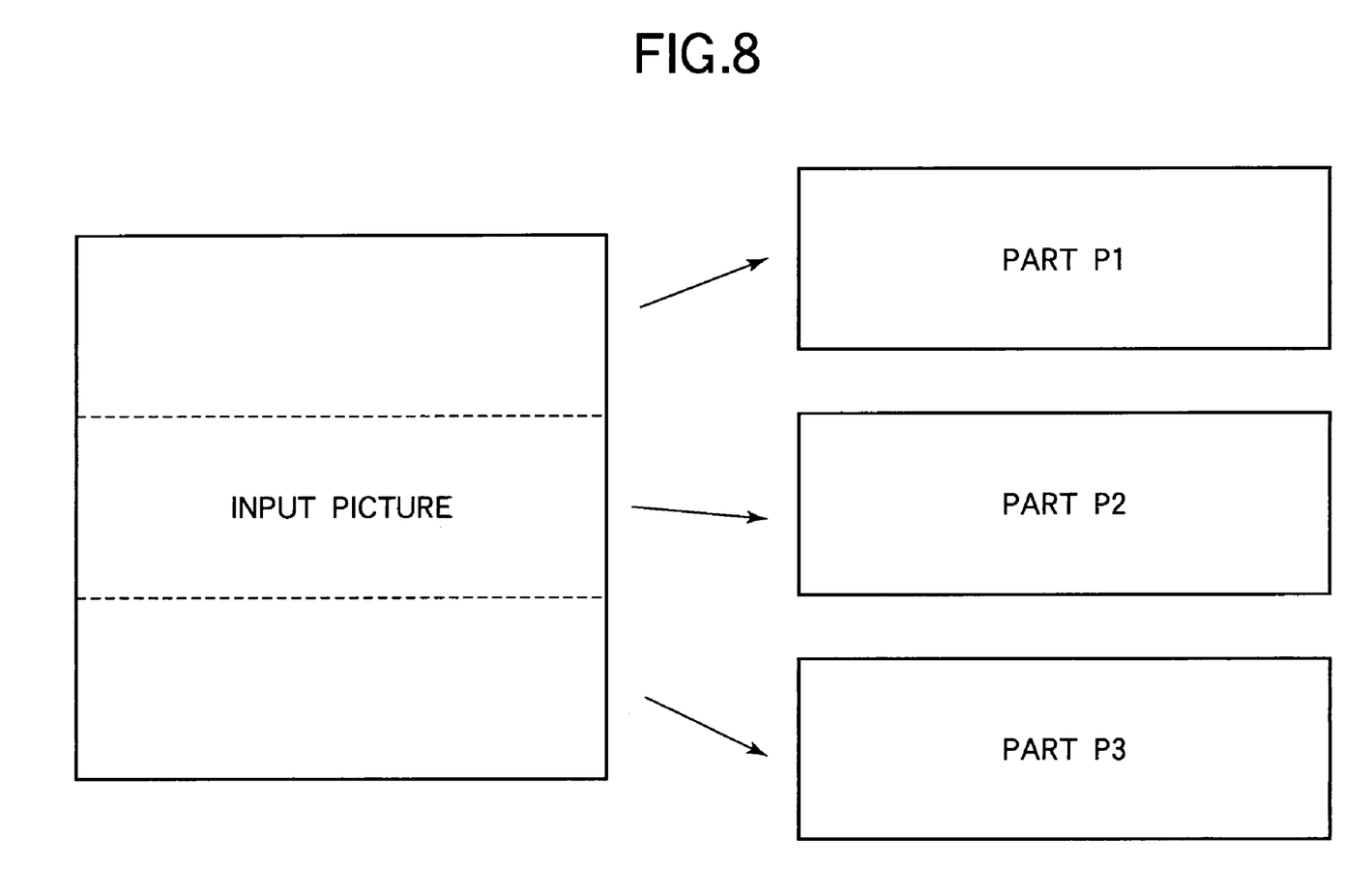
FIG. 8 illustrates the slicing of a picture into three parts in the second embodiment.

FIG. 8 illustrates the division of a picture into three substantially equal parts P1, P2, and P3. As in the first embodiment, when the picture is divided into parts, each coding unit may receive identifying information identifying the location of its part of the picture.

Coding unit 102, coding unit 103, and coding unit 602 decode and decompress each other's compressively coded data streams, and use the decompressed picture data as reference picture data in the compressive coding process.

The compressed stream output port 106 of coding unit 102 is connected to the compressed stream input port 107 of coding unit 103 and the compressed stream input port 107 of coding unit 602, the compressed stream output port 106 of coding unit 103 is connected to the compressed stream input port 107 of coding unit 102 and the compressed stream input port 107 of coding unit 602, and the compressed stream output port 106 of coding unit 602 is connected to the compressed stream input port 107 of coding unit 102 and the compressed stream input port 107 of coding unit 103. Each of the coding units 102, 103, 602 accordingly passes its compressively coded data stream to both of the other two coding units.

The compressed stream output port 106 of coding unit 102, the compressed stream output port 106 of coding unit 103, and the compressed stream output port 106 of coding unit 602 are also connected to the compressed stream combiner 603. Operating like the compressed stream combiner 104 in FIG. 1, the compressed stream combiner 603 combines the coded parts from the coding units 102, 103, 602 and outputs a compressively coded data stream.

Because the basic internal structure of each of coding units 102, 103, 602 is the same as shown in FIG. 3, the features of the second embodiment will be described with reference to FIG. 3.

The coding unit 300 in the second embodiment includes a different reference frame memory 308 from the first embodiment. More specifically, the switching of storage positions in the reference frame memory 308 differs from the first embodiment, as illustrated in FIG. 9.

Figure 9:
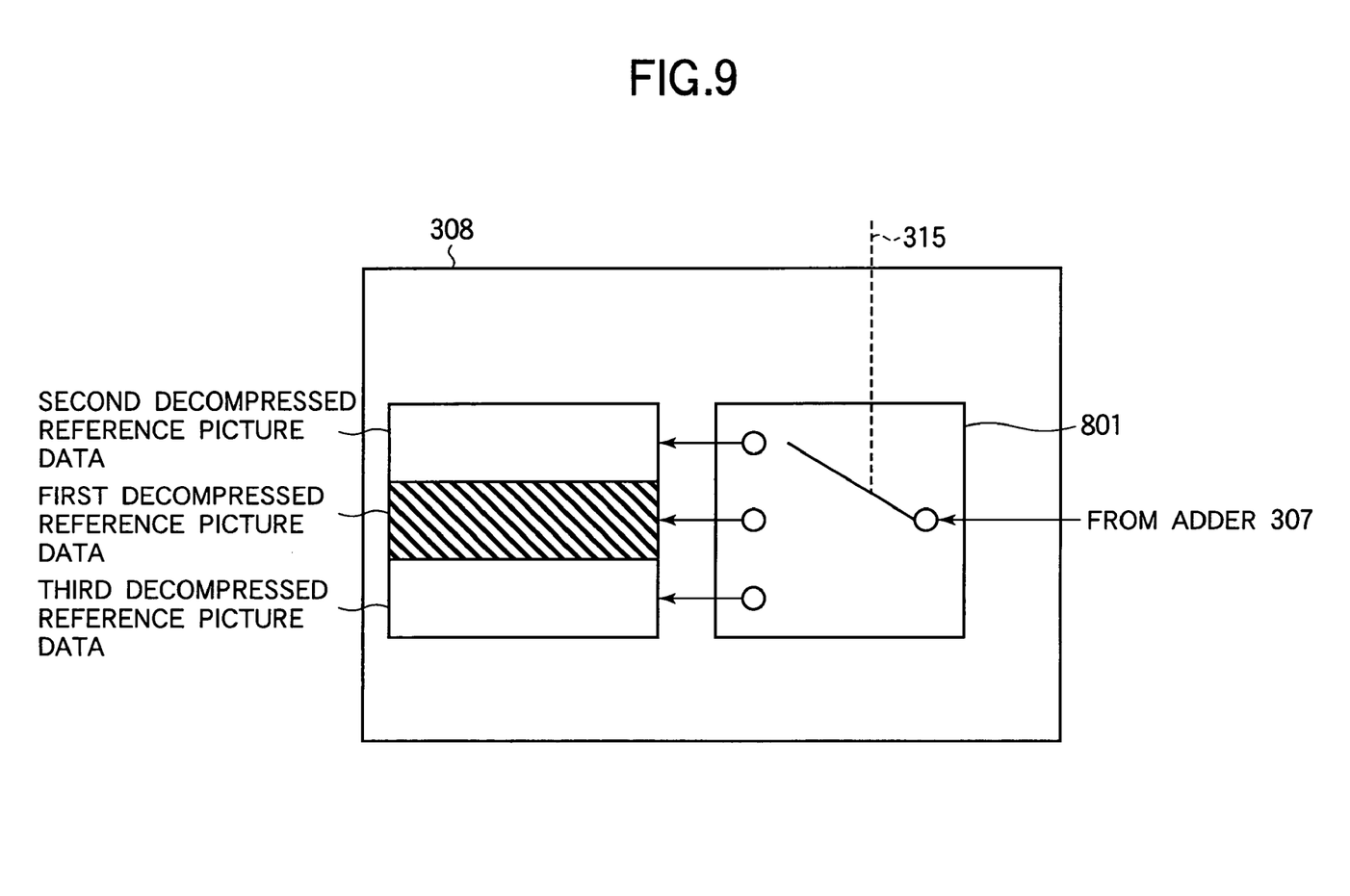
FIG. 9 illustrates the switching of storage positions in the reference frame memory in the second embodiment.

In FIG. 9, the coding unit 300 is assumed to code the middle part of the input picture. The coding unit 300 stores the reference picture data that it has coded and decompressed itself (first decompressed data) in the middle one of the three blocks in the reference frame memory 308. The upper and lower blocks in the reference frame memory 308 are used to store the reference picture data derived from the compressively coded data streams received from the other coding units (second decompressed data and third decompressed data).

Decompressed picture data are received from the adder 307 and stored by a switching processor 801 in the reference frame memory 308. When the switching processor 801 stores decompressed picture data that the coding unit 300 has coded itself, the switching processor 801 selects a location in the reference frame memory 308 corresponding to the position of the part of the input picture assigned to the coding unit 300.

As in the first embodiment, when the switching processor 801 receives the reference picture data from another coding unit, the switching processor 801 identifies the location assigned to the other coding unit according to identifying information included in the storage location switching control information 315 from the another coding unit: if the upper adjacent location is assigned to the another coding unit, the switching processor 801 selects the upper adjacent location to store the decompressed picture data from the adder 307; if the lower adjacent location is assigned to the another coding unit, the switching processor 801 selects the lower adjacent location to store the decompressed picture data from the adder 307.

The switching processor 801 may perform further switching functions within each of the three memory areas shown in FIG. 9, enabling each memory area to store both decompressed picture data for the current frame and decompressed picture for the preceding frame simultaneously, as discussed in the first embodiment.

The second embodiment has the same effects as described in the first embodiment regarding efficient communication between coding units and reduced costs.

In addition, because the number of coding units is increased from two to three, if the performance of a single coding unit is the same as in the first embodiment, the second embodiment enables higher-definition moving pictures to be coded in real time.

The invention is not limited to the two coding units shown in the first embodiment or the three coding units shown in the second embodiment. There may be four or more coding units.

When there are more than two coding units, it is not always necessary for each coding unit to receive the compressively coded data streams from all other coding units. Most coding schemes periodically disable the motion estimator 312, motion compensator 309, and subtractor 301 in FIG. 3 to generate intra-coded frames or macroblocks that can be decompressed without using the reference frame memory. If intra-coded frames or macroblocks are inserted at sufficiently frequent intervals and if the lengths of motion vectors are limited, it may be sufficient for each coding unit to receive only the compressively coded data streams from the coding units that code adjacent parts of the input picture.

In the second embodiment, for example, if the input picture is always divided as shown in FIG. 8 with coding unit 102 coding part P1, coding unit 103 coding part P2, and coding unit 602 coding part P3, then coding units 102 and 602 may only have to receive the compressively coded data stream output from coding unit 103.

The same applies if a coding scheme is adopted in which only intra-coded frames are stored in the reference frame memory.

If a coding unit stores only reference picture data for its own assigned part and adjacent parts of the input picture, it may not be possible to decompress all macroblocks in the adjacent parts, but this is permissible as long as the coding unit can always decompress enough macroblocks to generate the reference data it needs for compressing its own assigned part, including at least the macroblocks immediately adjacent to its own assigned part.

The invention is also applicable to coding schemes that employ bidirectional prediction, in which case the reference frame memory 308 stores reference picture data for two frames, or parts thereof, for use in coding frames located temporally between the two stored frames.

Although the method of dividing the input picture into parts is not specified in the first and second embodiments, various methods are available. For example, if the performance of coding units differs greatly, larger parts of the input picture may be assigned to coding units with higher performance, so that all parts of the input picture take substantially equally long to code.

Dynamic methods of dividing a picture into parts may also be used, so that the result may vary from one input picture to another. The position of the part in the input picture represented by the compressively coded stream data output by a particular coding unit may accordingly vary with every input picture. In this case the input picture partitioner 101 must attach location information to each output part of the input picture, and each coding unit must incorporate the location information into the identifying information (ID) it outputs in the storage location switching control information 315. The location information and ID may be, for example, a starting macroblock number. When the parts are made up of uniform horizontal slices, the location information and ID may be starting slice IDs that have a predetermined correspondence to macroblock numbers. Additional information such as the position of the last macroblock or slice in the part, or the number of macroblocks or slices in the part, may also be used.

The present invention is applicable to any system including a plurality of computing resources that code different parts of a picture concurrently. The computing resources may be different computers, different integrated circuit chips, or different parts of a single integrated circuit chip.

The present invention can also be practiced in picture-coding software that runs on a computing device or system of any of the types described above.

Those skilled in the art will recognize that further variations are possible within the scope of the invention, which is defined in the appended claims.

What is claimed is:

1. A picture coding apparatus for coding a moving picture made up of a series of frames, the picture coding apparatus comprising:

an input picture partitioner for dividing an input frame into three or more parts;

three or more coding units for compressively coding the parts, each of the coding units coding a different one of the parts which is assigned to said each of the coding units; and a combiner for combining the parts coded by the coding units to obtain compressively coded data for the entire input frame, wherein each coding unit of the three or more coding units comprises:

a reference frame memory for storing reference picture data representing the entirety of a frame preceding the input frame among the series of frames;

a motion compensator for selecting a portion of the reference picture data stored in the reference frame memory and performing motion compensation, the selected portion of the reference picture data resembling at least a portion of the part of the input frame to be coded by said each coding unit;

a compression processor for compressing the part of the input frame to be coded by said each coding unit with reference to the selected portion of the reference picture data and outputting, as first compressed data, the compressed part to be coded by said each coding unit;

a coder for coding the first compressed data and outputting the coded first compressed data as first coded data;

a compressed stream output port for outputting the first coded data to the combiner and to all of the other of the three or more coding units, so that the respective one of said all of the other of the three or more coding units receives the first coded data outputted from said each coding unit as second coded data for the respective coding unit;

a compressed stream input port for receiving second coded data for said each coding unit from said all of the other of the three or more coding units;

a decoder for decoding the second coded data for said each coding unit to obtain second compressed data; and a decompression processor for decompressing the first compressed data and the second compressed data to obtain the reference picture data representing the entirety of a frame of the moving picture and storing the reference picture data in the reference frame memory.

2. The picture coding apparatus of claim 1, wherein the first compressed data and the second compressed data include identifying information identifying the compressed parts of the input frame, and the reference frame memory stores the reference picture data at different locations according to the identifying information.

3. The picture coding apparatus of claim 1, wherein the compression processor includes a transform processor and a quantizer, the coder is a variable-length coder, the decompression processor includes a dequantizer and an inverse transform processor, and the decoder is a variable-length decoder.

4. The picture coding apparatus of claim 1, wherein each said coding unit further comprises a first switch for receiving the first compressed data from the compression processor and the second compressed data from the decoder and selectively supplying the first compressed data and the second compressed data to the decompression processor.

5. The picture coding apparatus of claim 1, wherein the motion compensator further comprises:
   a motion estimator for deriving first motion vectors for use in said motion compensation and supplying the motion vectors to the coder for inclusion in the first coded data; and
   a second switch for receiving the first motion vectors from the motion estimator and receiving second motion vectors from the decoder and selectively outputting the first and second motion vectors for use in said motion compensation.

6. A picture coding method for coding a moving picture made up of a series of frames, comprising:
   dividing an input frame into three or more parts;
   assigning different ones of the parts to different coding units in a coding apparatus,
   coding by each of the different coding units the part assigned to said each of the different coding units, and
   combining the coded parts from the different coding units to obtain compressively coded data for the input frame,
   wherein the coding by each coding unit comprises:
      storing reference picture data representing the entirety of a frame preceding the input frame among the series of frames;
      selecting a portion of the stored reference picture data and performing motion compensation, the selected portion of the stored reference picture data resembling at least a portion of the assigned part of said each coding unit;
      compressing the assigned part of said each coding unit with reference to the selected portion of the reference picture data to generate first compressed data;
      coding the first compressed data to obtain and output first coded data;
      outputting the first coded data to all of the other of the different coding units in the coding apparatus, so that the respective one of said all of the other of the different coding units receives the first coded data outputted from said each coding unit as second coded data for the respective coding unit;
      receiving second coded data for said each coding unit from said all of the other of the different coding units;
      decoding the second coded data for said each coding unit to obtain second compressed data; and
      decompressing the first compressed data and the second compressed data to obtain new reference picture data representing the entirety of a frame of the moving picture and storing the new reference picture data.

7. The method of claim 6, wherein the first compressed data and the second compressed data include identifying information identifying the compressed parts of the input frame, and the reference picture data are stored at different locations according to the identifying information.

8. The method of claim 6, wherein compressing the assigned part further comprises performing a transform and quantization, coding the first compressed data further comprises variable-length coding, decoding the second coded data further comprises variable-length decoding, and decompressing the first compressed data and the second compressed data further comprises dequantization and an inverse transform.

9. The method of claim 6, further comprising using a switch to select one of the first compressed data and the second compressed data for decompression.

10. The method of claim 6, wherein selecting a portion of the stored reference picture data resembling at least a portion of the assigned part further comprises deriving first motion vectors, the first motion vectors being included in the first coded data.

11. The method of claim 10, further comprising:
   receiving second motion vectors in the second coded data; and
   using a second switch to select one of the first motion vectors and the second motion vectors for use in said motion compensation.

* * * * *